United States Patent
Stolte et al.

(10) Patent No.: US 10,553,882 B2
(45) Date of Patent: Feb. 4, 2020

(54) FUEL CELL SYSTEM FOR AN AIRCRAFT, METHOD FOR OPERATING A FUEL CELL SYSTEM IN AN AIRCRAFT AND AIRCRAFT WITH SUCH A FUEL CELL SYSTEM

(71) Applicant: Airbus Operations GmbH, Hamburg (DE)

(72) Inventors: Ralf-Henning Stolte, Hamburg (DE); Ralf Peck, Lueneburg (DE)

(73) Assignee: Airbus Operations GmbH (DE)

( * ) Notice: Subject to any disclaimer, the term of this patent is extended or adjusted under 35 U.S.C. 154(b) by 615 days.

(21) Appl. No.: 14/031,176

(22) Filed: Sep. 19, 2013

(65) Prior Publication Data

US 2014/0087283 A1 Mar. 27, 2014

Related U.S. Application Data

(60) Provisional application No. 61/703,366, filed on Sep. 20, 2012.

(30) Foreign Application Priority Data

Sep. 20, 2012 (EP) .................................... 12185311

(51) Int. Cl.
*H01M 8/04* (2016.01)
*H01M 8/04082* (2016.01)
*H01M 8/04303* (2016.01)
*H01M 8/04302* (2016.01)

(52) U.S. Cl.
CPC ... *H01M 8/04201* (2013.01); *H01M 8/04302* (2016.02); *H01M 8/04303* (2016.02)

(58) Field of Classification Search
CPC .................................. H01M 8/04; H01M 8/24
See application file for complete search history.

(56) References Cited

U.S. PATENT DOCUMENTS

| 7,954,753 | B2 | 6/2011 | Hoffjann et al. |
| 2004/0040312 | A1 | 3/2004 | Hoffjann et al. |
| 2004/0126635 | A1 | 7/2004 | Pearson |
| 2006/0088743 | A1 | 4/2006 | Gallagher et al. |

(Continued)

FOREIGN PATENT DOCUMENTS

| DE | 10 2004 058 430 A1 | 6/2006 |
| DE | 102005053694 B3 | 1/2007 |
| DE | 10 2005 010 399 B4 | 8/2010 |

*Primary Examiner* — Barbara L Gilliam
*Assistant Examiner* — Nathanael T Zemui
(74) *Attorney, Agent, or Firm* — Lerner, David, Littenberg, Krumholz & Mentlik, LLP (57) ABSTRACT

A fuel cell system includes a first fuel cell unit having a first fuel cell and a second fuel cell, a second fuel cell unit having a third fuel cell and a fourth fuel cell, a hydrogen tank coupled to all fuel cells, an oxygen supply unit and an air inlet. Oxidant inlets of the first fuel cell and the fourth fuel cell are couplable with the air inlet. Oxidant inlets of the second fuel cell and the third fuel cell are couplable with the oxidant supply unit couplable with at least one of the oxygen supply unit and the air inlet. Exhaust outlets of the first and fourth fuel cells are couplable with an inert gas outlet. Exhaust outlets of the second and third fuel cells are coupled with an exhaust switching unit couplable with the inert gas outlet and a water outlet.

13 Claims, 2 Drawing Sheets

(56) References Cited

U.S. PATENT DOCUMENTS

| | | | |
|---|---|---|---|
| 2008/0001026 A1* | 1/2008 | Hoffjann | B64D 11/02 |
| | | | 244/58 |
| 2008/0107933 A1 | 5/2008 | Gallagher | |
| 2008/0191094 A1* | 8/2008 | Heinrich | B64D 11/02 |
| | | | 244/118.5 |
| 2008/0210812 A1 | 9/2008 | Gans et al. | |
| 2010/0018723 A1* | 1/2010 | Bleil | A62C 3/08 |
| | | | 169/45 |
| 2010/0252688 A1* | 10/2010 | Koeppen | F02N 11/04 |
| | | | 244/53 A |

* cited by examiner

FUEL CELL SYSTEM FOR AN AIRCRAFT, METHOD FOR OPERATING A FUEL CELL SYSTEM IN AN AIRCRAFT AND AIRCRAFT WITH SUCH A FUEL CELL SYSTEM

CROSS-REFERENCE TO RELATED APPLICATIONS

This application claims the benefit of the filing date of U.S. Provisional Patent Application No. 61/703,366, filed Sep. 20, 2012, the disclosure of which is hereby incorporated herein by reference.

TECHNICAL FIELD

The invention relates to a fuel cell system for an aircraft, a method for operating a fuel cell system in an aircraft and an aircraft with such a fuel cell system.

BACKGROUND OF THE INVENTION

Large commercial aircraft comprise a variety of different systems that are designed with a certain redundancy depending on the functions they have to provide. The provision of a continuous electrical power supply, for example, is elementary for a correct function of the aircraft, such that often a high reliability through a combination of a plurality of different power supply systems is achieved. Besides engine driven generators an aircraft usually comprises a ram air turbine for emergency cases that either provides hydraulic power for driving a generator by means of a hydraulic motor or for driving the generator directly. A ram air turbine is extendable into the air flow in the case of an emergency but has limited power in low velocity flight situations, e.g. during the approach.

Alternative concepts for providing emergency power in aircraft exist by means of fuel cell systems that consume oxygen and hydrogen from dedicated tanks. DE 10 2005 010 399 B4 discloses an aircraft with a fuel cell system, which is independent from ambient air and which is switched off during normal flight.

It is furthermore known to use the exhaust gas of a fuel cell for inerting a space in a vehicle and for suppressing fire. For example, DE 10 2005 053 694 discloses a fuel cell system for extinguishing fires in an aircraft, wherein the fuel cell is supplied with hydrogen and air and is used for generating nitrogen enriched air.

Lastly, DE 10 2004 058 430 discloses a multi functional fuel cell system with an increased safety of operation.

BRIEF SUMMARY OF THE INVENTION

Fuel cells may be used for a variety of different tasks in an aircraft, as stated above. In order to be able to direct a plurality of tasks to be accomplished to a fuel cell system, especially in an aircraft, it is paramount to establish a sufficient reliability on the one hand and a least possible weight on the other hand. Therefore an aspect of the present invention proposes a fuel cell system that is able to accomplish a variety of different tasks with an enhanced reliability and a least possible weight for improving the overall efficiency of the aircraft in which this fuel cell system is to be integrated.

A fuel cell system is proposed that comprises a first fuel cell unit having at least one first fuel cell and at least one second fuel cell, a second fuel cell unit having at least one third fuel cell and at least one fourth fuel cell, a hydrogen tank, an oxygen supply unit and at least one air inlet. The first fuel cell unit and the second fuel cell unit are operable independently. Each of the first fuel cell, the second fuel cell, the third fuel cell and the fourth fuel cell comprises a hydrogen inlet couplable with the hydrogen tank. Each of the first fuel cell, the second fuel cell, the third fuel cell and the fourth fuel cell comprises an oxidant inlet, wherein the oxidant inlets of the first fuel cell and the fourth fuel cell are couplable with the at least one air inlet, wherein the oxidant inlets of the second fuel cell and the third fuel cell are couplable with at least one oxidant supply unit, said oxidant supply unit is couplable with at least one of the oxygen tank and the at least one air inlet. Each of the first fuel cell, the second fuel cell, the third fuel cell and the fourth fuel cell comprises an exhaust outlet, wherein the exhaust outlets of the first fuel cell and of the fourth fuel cell are couplable with at least one inert gas outlet and wherein the exhaust outlets of the second fuel cell and of the third fuel cell are coupled with at least one exhaust switching unit, wherein said exhaust switching unit is couplable with the at least one inert gas supply outlet and a water outlet.

The fuel cell system according to an embodiment of the invention therefore comprises two independent fuel cell units, wherein each of these fuel cell units is capable of providing electrical power, emergency electrical power, nitrogen enriched air for inerting or fire suppression, water and heat. The fuel cell system may simply be switched from the operation of one of the fuel cell units to the operation the other fuel cell unit in case a defect occurs in the operated fuel cell unit. Therefore the individual fuel cell units should be designed such that they are individually capable of sufficiently supplying power. Both fuel cell units may exemplarily be realised similar or identical to each other. In the following the operation principle of the fuel cell system according to an embodiment of the invention is explained in more detail.

In each one of the fuel cell units one fuel cell exists that is coupled with a hydrogen tank and to an air inlet. These fuel cells are named "first fuel cell" and "fourth fuel cell" for the sake of clarity and the ability to differentiate the fuel cells. During the fuel cell process in this (first or fourth) fuel cell the oxygen content of the supplied air from the air inlet is reduced through the chemical reaction with hydrogen. Resulting water vapor exits the fuel cell carried by residual air having a reduced oxygen content and may be extracted from the exhaust gas by means of a condenser for further use inside the vehicle, e.g. for toilets. Since the exhaust gas of this (first or fourth) fuel cell is nitrogen enriched it is usable as an inert gas dedicated for inerting a closed space or for fire protection purposes.

The other fuel cell in the respective fuel cell unit, i.e. the second fuel cell of the first fuel cell unit or the third fuel cell of the second fuel cell unit, is also coupled with the hydrogen tank. However, the oxidant inlet here is coupled with an oxidant supply unit which is capable of supplying either pure oxygen or air. In case the oxidant supply unit supplies air to the respective fuel cell the resulting exhaust gas will be a nitrogen enriched (inert) gas having a content of reaction water vapor. In the other case, when the oxidant supply means supplies oxygen to the fuel cell, the exhaust will exclusively consist of water and, if the fuel cell process is not perfectly stoichiometric, may also comprise residual hydrogen and/or oxygen.

A main operation of the fuel cell system according to an embodiment of the invention may therefore have the purpose of constantly supplying electrical energy under consumption of air and hydrogen, accompanied by the delivery of an inert gas and water. This operation may include operating at least one of the fuel cell units and at least one fuel cell of the respective fuel cells integrated within the respective fuel cell unit. This means that literally any number of fuel cells may be used for providing electrical energy.

During ground operation of the aircraft all available fuel cells may be operated when the engines of the aircraft are not yet started. The noise level of the aircraft is therefore very low on ground although the main systems are operated, e.g. air conditioning, lights, avionics, etc.

For the purpose of increasing redundancy it may be feasible to generally operate only one of the fuel cell units at once when main electrical power is needed. The inert gas arising during the main operation may be used for inerting a closed space in the aircraft, e.g. a fuel tank, a cargo space, a part of a fuselage surrounding a trimmable horizontal stabilizer or any other closed space.

Besides the main operation the fuel cell system according to an embodiment of the invention may additionally provide emergency electrical power by the exclusive consumption of oxygen from a dedicated oxygen supply unit, e.g. an oxygen tank, independent from ambient air, and hydrogen. For example, such an emergency operation is necessary during a failure of an aircraft engine as a main air source or if an air inlet is clogged. If an aircraft enters volcanic ash a failure may occur in the engines. Hence, the provision of emergency power has to be independent from any air source. Therefore, it is paramount in these emergency cases to use a separate oxygen tank for supplying an oxidant to the respective fuel cell(s). As the emergency cases are very rare by nature it is not considered necessary to integrate dedicated fuel cells in a fuel cell system, which are permanently exclusively coupled with an oxygen source. It is considered more beneficial to allow an alternate connection to an air source to enhance the reliability of the overall system.

Furthermore, the fuel cell system according to an embodiment of the invention may provide emergency power under consumption of air and hydrogen in case an electrical connection of engine driven generators fails. An air supply through the engines may still be present and the fuel cell system is not limited to the supply of pure oxygen.

The double-unit arrangement itself leads to a redundancy of the fuel cells that are coupled with the air supply. Therefore, if the respective fuel cell of one of the fuel cell units experiences a failure it may simply be switched off after the respective fuel cell of the other fuel cell unit has been started. The second and third fuel cell may remain in a stand-by state or may completely be switched off. Preferably, all fuel cells of all fuel cell units are in a state that allows an immediate start of operation.

Additionally to this, if one of the fuel cell units has a more severe defect, for example through a blocked line or valve in a hydrogen supply line there is still a redundancy present in that the other fuel cell unit comprises two fuel cells that may either operated so as to consume air and hydrogen or, in case of an emergency, one of these two fuel cells may exclusively be operated under consumption of hydrogen and oxygen.

For the sake of clarity it is stressed that the expression "fuel cell" does not necessarily relate to a single fuel cell but instead also relates to an arrangement of multiple fuel cells or fuel cell stacks. Moreover, this expression is used for the purpose of differentiation.

Altogether, the fuel cell system according to an embodiment of the present invention has clear advantages in terms of reliability and safety of operation as the ability of providing power, emergency power and inert gas is comparable or better than in prior art systems, wherein the weight of the system is comparably low at the same time.

In an advantageous embodiment the oxidant supply unit may comprise a manifold with an air inlet and an oxygen inlet and at least one check valve for preventing a cross-flow between the oxygen inlet and the air inlet. This oxidant supply unit is mechanically simple, yet reliable, and of a light-weight construction. It is also clear that an oxygen source or an air source may comprise means for interrupting a flow of air or oxygen, such as a flap, a valve or other suitable means.

In an exemplary embodiment the first fuel cell and the second fuel cell of the first fuel cell unit are realized as independent fuel cell stacks. Furthermore also the third fuel cell and the fourth fuel cell of the second fuel cell unit may be realized as independent fuel cell stacks. Thereby, each of the fuel cell units comprises a double-stack arrangement with two independently operable stacks for clearly enhancing the reliability and safety of operation. Local defects in a fuel cell stack do not necessarily lead to a complete failure of the respective fuel cell stack, they may only slightly decrease the voltage or total current, depending on the connection design of the single fuel cell elements in the stack. In case a higher power demand is necessary temporarily or permanently both individual fuel cell stacks of a single fuel cell unit may be operated at the same time.

In this context, a higher power demand may be present in an aircraft operating state in which temporarily more electrical power is necessary than in other aircraft operating states and/or in which the fuel cell system needs to deliver more electrical power as during a normal operating state. For example, if the aircraft comprises engine driven generators as main electrical current sources and an additional fuel cell system, the fuel cell system may have to balance out a lack of electrical power from the generators if the engines are not running or running in an idle state. Therefore, a higher power demand may be present both on ground and during flight.

In another exemplary embodiment the at least one first fuel cell and the at least one second fuel cell of the first fuel cell unit or the at least one third fuel cell and the at least one fourth fuel cell of the second fuel cell unit comprise a plurality of subcells, wherein adjacent subcells are associated to different fuel cells. The subcells may create a serial electrical connection and may further utilize a diode circuit that allows the operation of e.g. one fuel cell stack alone in case of the other one is switched off. Thereby, subcells of the first and second fuel cells and/or the third and fourth fuel cells are positioned one next to the other such that each of the two stacks is constituted by the sequential arrangement of two differently associated fuel cells. This not only leads to a higher compactness but also to a reduced weight as, for example, common hydrogen and/or oxidant ducts or passages as well as a common frame may be used.

Another embodiment of the fuel cell system comprises an inert gas switching means that selectively connects the exhaust outlets to either an inert gas outlet connectable to a space to be inerted or an inert gas outlet connectable to a fire extinguishing apparatus. Thereby, the fuel cell system may be used for fire protection or fire extinguishing if a fire danger or a fire occurs, e.g. during a flight of the aircraft. In this regard it is stated that the exhaust of the fuel cell system may be used as a supplement for another fire extinguishing agent or exclusively for extinguishing a fire. As explained above oxygen depleted air is generated in case a fuel cell of the fuel cell system is operated under supply of air and hydrogen. If the volume flow of generated oxygen depleted air clearly exceeds a potential leakage of the respective space it may be used for inerting or fire suppression.

Preferably, a water extraction unit is arranged downstream of the inert gas switching means such that inert gas intended for inerting a space may be dried prior to supplying it to the respective space.

Additionally, it may be feasible to provide a certain fire extinguishing agent from a dedicated fire extinguishing agent tank or supply unit into a space of the aircraft where the fire occurs. Thereby, a quick oxygen depletion can be accomplished. Afterwards, for the purpose of maintaining a low oxygen concentration, a potential leakage of the fire extinguishing agent can be compensated through constantly supplying inert gas from the fuel cell system into the related space of the aircraft.

An advantageous embodiment comprises a cooling circuit for each stack having a coolant line and a heat sink, wherein the coolant line is thermally coupled with the respective fuel cell of the respective fuel cell unit and is thermally coupled with the heat sink. Therefore, each fuel cell unit is individually cooled and a failure of one of the fuel cell units and/or of the relating cooling circuit does not result in a total loss of cooling capacity.

In a further advantageous embodiment the coolant line extends through all fuel cells of a respective fuel cell unit in a serial arrangement. This means that the necessary length of the coolant line may be reduced as it extends through all fuel cells one after another.

In another embodiment, the coolant line may also extend through all fuel cells of a respective fuel cell unit in a parallel arrangement. Furthermore, a serial and a parallel connection may be combined such that a plurality of first fuel cells may be flown through by a coolant in series. Another coolant line may extend through a plurality of second fuel cells. These two coolant lines may be coupled with a coolant supply line in a parallel connection.

It may be helpful to use a coolant that may be pumped through the coolant circuit having a low weight and a high heat capacity and that preferably may be operating at a rather low temperature for being able to absorb heat from a plurality of fuel cells and to deliver it through the heat sink to the environment independently from the ambient temperature.

A further exemplary embodiment of the fuel cell system comprises an interruption means and an emergency power bus port coupled with the interruption means, wherein the interruption means is couplable with the second and the third fuel cell. By integration of the interruption means it may be avoided that a constant connection between the second and third fuel cell to an emergency power bus of the aircraft leads to the danger of damage of the second or third fuel cell. In the electric system a severe failure may occur, e.g. in case the aircraft travels through a thunderstorm. In such a situation an electric impulse may reach the emergency power bus, which would lead the current to the second and third fuel cell, which may be destroyed. By using the interruption means a connection to the emergency bus is only present in emergency cases. Hence, the interruption means should be designed such that large electrical impulses in the form of e.g. lightning strikes can be borne.

A further exemplary embodiment comprises a control unit coupled with the first fuel cell unit and the second fuel cell unit, wherein the control unit is adapted for controlling the operation of the first and second fuel cell units, wherein the operation comprises a. the operation of either the first fuel cell unit or the second fuel cell unit in a first mode of operation, in which either at least one of the first fuel cell and the second fuel cell, or at least one of the third fuel cell and the fourth fuel cell of the respective fuel cell unit is operated by the exclusive supply of air and hydrogen;

b. the operation of the first fuel cell unit or the second fuel cell unit in a second mode of operation, in which only the second fuel cell or only the third fuel cell of the respective fuel cell unit is operated by the supply of oxygen and hydrogen without the supply of air; and c. the operation of the first fuel cell unit and the second fuel cell unit at the same time in a third mode of operation, in which at least one of the first fuel cell and the second fuel cell and at least one of the third fuel cell or the fourth fuel cell in the respective fuel cell unit is operated by the exclusive supply of air and hydrogen.

The first mode of operation resembles the normal operation (in flight) for providing electrical energy to a main electric bus. Air and hydrogen are supplied to the respective fuel cell for conducting the fuel cell process for providing inert gas, water and electrical energy. The second mode of operation resembles an emergency case wherein it is avoided to use air from engines, the surrounding or the cabin by simply using oxygen from an oxygen tank supplied to the respective fuel cell. In this operation mode, one or both fuel cell units may be operated, depending on the power demand of the aircraft. The third mode of operation is directed to the use of both fuel cells in the respective fuel cell unit in case a higher power demand is necessary temporally or constantly. For this purpose the oxidant supply unit supplies air to an oxidant input of the respective fuel cell. During flight one of the fuel cell units may thereby be a "sleeping system" that is only used in an emergency case. On ground and/or during higher power demand fuel cells of more than one fuel cell unit may be operated. In the case where fire protection or fire suppression may be necessary it is feasible to operate both fuel cell units for increasing the possible volume flow of inert gas at least temporarily. In the normal operation of the aircraft in flight, one fuel cell of each fuel cell unit is a backup for cases of inoperability.

An advantageous embodiment of the fuel cell system comprises at least one heat exchanger, which heat exchanger is used as heat sink for the cooling system and comprises at least one passage for leading through the coolant. The at least one heat exchanger may be realized as a skin heat exchanger having plated-shaped fins that deliver heat to the surrounding air that passes by the heat exchanger, wherein the surrounding air is usually clearly cooler than the temperature level of the respective fuel cell stack. Alternatively, the at least one heat exchanger may be a ram air heat exchanger that may be integrated into a ram air channel.

A further exemplary embodiment comprises an mixing unit, e.g. a jet pump, having an oxygen input, an exhaust input and an oxidant output couplable with the second fuel cell of the first fuel cell unit and the third fuel cell of the second fuel cell unit, wherein the mixing unit is adapted for mixing exhaust gas from a fuel cell and oxygen and providing a resulting mixture at the oxidant output, wherein the oxidant output is couplable to the at least one oxidant supply unit.

The invention also relates to an aircraft with such a fuel cell system. In a preferred exemplary embodiment the aircraft comprises at least one engine having a bleed air port, wherein the at least one air inlet is couplable with a bleed air port of the at least one engine. The bleed air port may be connected to pressure reducing valves, coolers or other means that are necessary for conditioning the bleed air for further use in the aircraft. It is mandatory to reduce the bleed air temperature to a level suitable for operating a fuel cell, e.g. below 60° C. in case the fuel cells are realized as PEM-fuel cells for protecting the membrane.

In a further exemplary embodiment the aircraft may comprise a bleed air driven environmental control system having an air supply line, wherein the at least one air inlet of the fuel cell system is couplable with the air supply line. Such an air supply line may be realized as a trim air supply line of a trim air supply unit, which delivers conditioned air with a temperature exceeding the average temperature level of air delivered into the cabin to be conditioned for the purpose of achieving different temperature levels in different cabin zones by using one source of cool air that may be brought to higher temperature levels by adding warmer trim air. The air inlet may also be coupled with any other air source of an environmental control system.

In another exemplary embodiment the aircraft comprises an ambient air inlet that is couplable with the at least one air inlet of the fuel cell system. Such an ambient air inlet may be a NACA-inlet or a ram air inlet, wherein for the purpose of using ambient air during ground operation a further compressor may be positioned between the ambient air inlet and the air inlet.

Furthermore, the hydrogen tank of the fuel cell system may be realized as at least one central hydrogen tank in the aircraft. The at least one central hydrogen tank may comprise a plurality of hydrogen tanks and may be realized as a cryogenic hydrogen tank located outside a pressurized part of the aircraft fuselage. Furthermore, the oxidant supply unit may be realized as a pressurized oxygen tank located inside a pressurized region of the aircraft fuselage. Alternatively, such an oxidant tank may also be arranged in an unpressurized region of the aircraft fuselage and in a clear distance to the at least one hydrogen tank. The at least one hydrogen tank and the at least one oxidant supply unit may be realized as central tanks independent from the fuel cell system according to the invention but may also be realized as local, dedicated tanks.

In a still further exemplary embodiment at least one heat exchanger of the fuel cell system is located on a skin of the aircraft. Preferably, the at least one heat exchanger comprises skin fins and may be located at an underside of a tail cone of the aircraft. Besides skin fin heat exchangers other kinds of heat exchangers that allow transferring heat to the surrounding of the aircraft. In another embodiment the aircraft may comprise at least two skin heat exchangers, each being coupled with a coolant circuit of the fuel cell system.

In a still further exemplary embodiment each coolant circuit is thermally coupled with the hydrogen tank for the purpose of supplying hydrogen from the hydrogen tank to a line connected thereto.

The invention further relates to a method for operating a fuel cell system. Thereby the same operating modes may be realized as stated above. Method for operating a fuel cell system (2) in different modes of operation, the fuel cell system (2) comprising a first fuel cell unit (4) with a first fuel cell (8) and a second fuel cell (10) and a second fuel cell unit (6) with a third fuel cell (54) and a second fuel cell (56), the modes of operation comprising:

a. operating either the first fuel cell unit (4) or the second fuel cell unit (6) in a first mode of operation if a normal operation is intended, in which either at least one of the first fuel cell (8) and the second fuel cell (10) or at least one of the third fuel cell (54) and the fourth fuel cell (56) of the respective fuel cell unit (4, 6) is operated by the exclusive supply of air and hydrogen; or b. operating the first fuel cell unit (4) or the second fuel cell unit (6) in a second mode of operation if emergency power is required, in which either only the second fuel cell (10) or only the third fuel cell (54) of the respective fuel cell unit (4, 6) is operated by the supply of oxygen and hydrogen without the supply of air; or c. operating the first fuel cell unit (4) and the second fuel cell unit (6) simultaneously in a third mode of operation if temporarily a higher power demand occurs during normal operation, in which at least one of the first fuel cell (8) and the second fuel cell (10) and at least one of the third fuel cell (54) or the fourth fuel cell (56) in the respective fuel cell unit (4, 6) is operated by the exclusive supply of air and hydrogen.

In the first mode of operation, a normal supply of power is accomplished, e.g. during cruise flight of the aircraft. The operation of one of the fuel cell units may be sufficient. As an alternative or a supplement, the other fuel cell unit may be operated simultaneously for situations with a higher power demand. In emergency cases, the fuel cell system may be operated by supply of pure oxygen to one fuel cell unit, without the use of air. In case a higher demand is present, the other fuel cell unit may be operated simultaneously such that both fuel cell units are operated under supply of oxygen and hydrogen at the same time.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1:
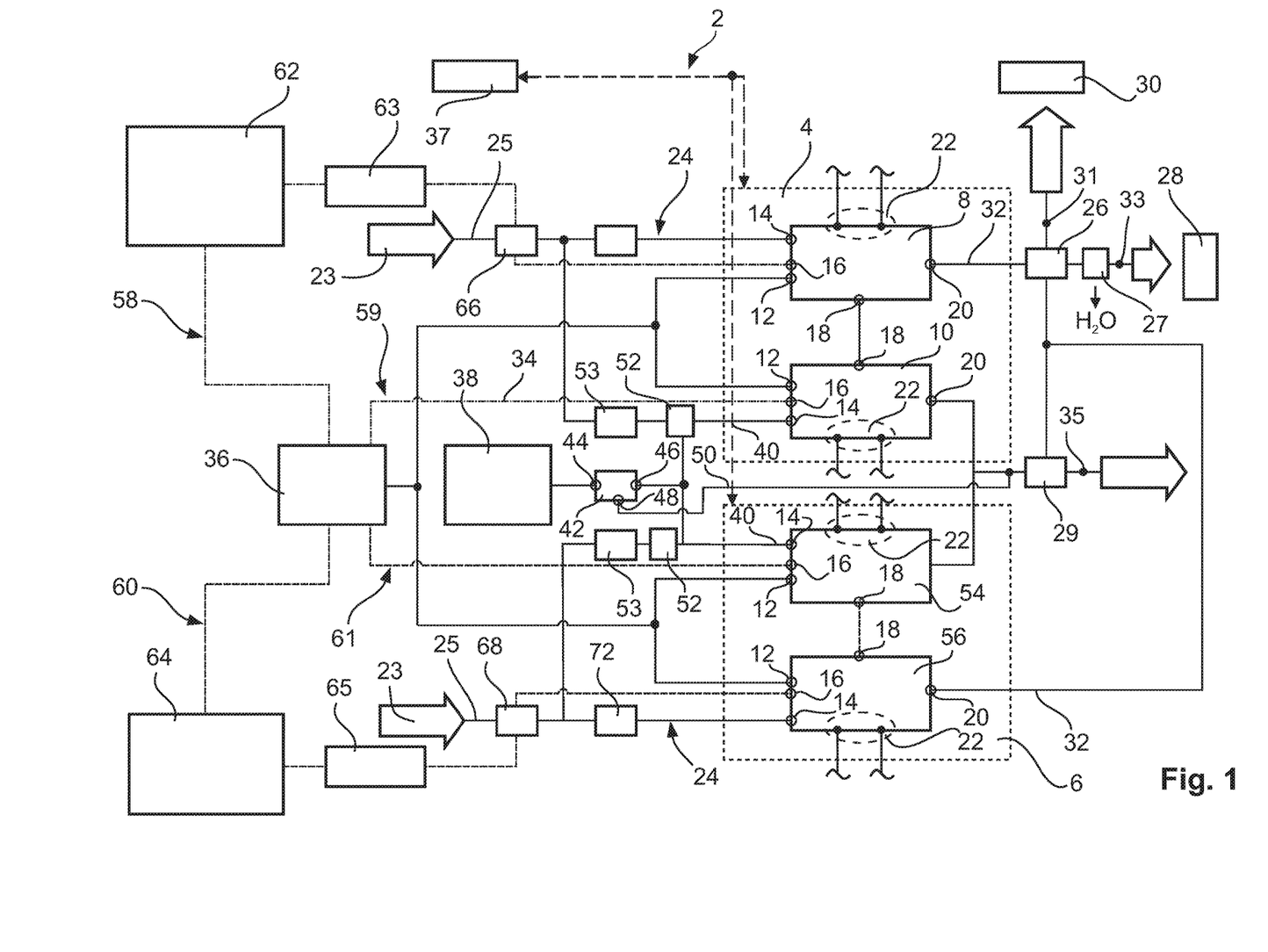
FIG. 1 shows a fuel cell system in a schematic, block-oriented view.

The overall setup is shown in FIG. 1 in a block oriented schematic view. A fuel cell system 2 comprises a first fuel cell unit 4 and a second fuel cell unit 6 that are operable separately from each other. Both fuel cell units 4 and 6 comprise at least two fuel cells that may be operated in a different manner. The first fuel cell unit 4 comprises a first fuel cell 8 and a second fuel cell 10 that both have a hydrogen inlet 12, an oxidant inlet 14, two coolant ports 16 and 18 and an exhaust outlet 20. By supplying an oxidant into the oxidant inlet 14 and hydrogen into the hydrogen inlet 12 the fuel cell process can be conducted. Thereby, electrical power is generated that is supplied through an electrical outlet 22 to an electric network. Besides that, water is generated through the chemical reaction between the oxidant and the hydrogen, leading to water vapor exiting the fuel cells 8 and 10 through the exhaust outlet 20.

The main difference between the first fuel cell 8 and the second fuel cell 10 lies in the different oxidant supply connections. The first fuel cell 8 is exclusively coupled with an air supply line 24, which is supplied with air 23 from an air inlet 25 with an ambient typical composition of 78% nitrogen, 21% oxygen and other gases. The air 23 may thereby be ambient air from a ram air inlet, a NACA inlet, air conditioned in an environmental control system, trim air from an environmental control system, pre-cooled bleed air or any other variant. Hence, after the reaction of the oxygen part mainly nitrogen enriched air together with water vapor leaves the exhaust outlet 20. As nitrogen is an inert gas it may be used for inerting purposes, for fire suppression or for fire protection. Therefore, an inert gas switching unit 26 is provided that selectively supplies the inert gas from the exhaust outlet 20 either to an inert gas outlet 33, which is coupled to a space to be inerted 28 or to an inert gas outlet 31, which is coupled with a fire protection apparatus 30. Said fire extinguishing apparatus 30 may comprise a variety of fire extinguishing agent outlets and buffer tanks for buffering gaseous fire extinguishing agents and inert gas respectively. The inert gas exiting the exhaust outlet 20 is routed by means of an exhaust line 32 to the inert gas switching unit 26. Before using the inert gas for inerting purposes it may be dried by means of a water extraction unit 27 that may be arranged downstream of the inert gas switching unit 26 and upstream of the respective inert gas outlet 33. The water extracted by the water extraction unit 27 may be stored in a water tank or may be discharged overboard. The effectiveness of the fire extinguishing function is improved when the water vapor content remains in the inert gas such that drying the inert gas before delivering it to the fire extinguishing apparatus 30 is not necessary.

The hydrogen supply is realized by means of a hydrogen supply line 34 that is coupled with a central hydrogen tank system 36. This tank system 36 may be realized as a cryogenic hydrogen tank for the purpose of keeping the hydrogen in a liquid state to save space. Furthermore, as the hydrogen inside the tank system 36 has a certain risk potential it may be positioned in a fuselage section of an aircraft that utilizes this fuel cell system 2 that is not air conditioned and thus not pressurized.

The use of the first fuel cell 8 is therefore mainly directed to a normal operation for providing electrical energy inside the aircraft. Nitrogen enriched air/inert gas may be used for inerting purposes and water that occurs during the fuel cell process may be recycled for internal use inside the aircraft.

Contrary to this the second fuel cell 10 is coupled with an oxygen supply unit realized as a central oxygen tank 38 by means of an oxidant line 40. Thereby, the second fuel cell 10 may be operated completely independent from ambient air such that this second fuel cell 10 is predestined for providing emergency power, e.g. in the case of engine failures due to a flight through volcanic ash or any other incident. The exhaust outlet 20 of the second fuel cell 10 is coupled with an exhaust switching unit 29 that selectively supplies water vapor as exhaust to a water outlet 35, which may be coupled with a water reservoir or a drainage opening, in case the second fuel cell 10 is operated with pure oxygen or to the inert gas switching unit 26 in case of the second fuel cell 10 is operated with air and therefore delivers an inert gas containing water vapor.

The advantage of these different connections of the first fuel cell 8 and the second fuel cell 10 lies in that it is very improbably or almost impossible to supply pure oxygen from the oxygen tank 38 through any of the fuel cells 8 or 10 into the space 28 to be inerted. Also, by using two independent fuel cells 8 and 10 the reliability and safety of operation is clearly increased.

For avoiding the supply of pure oxygen to the second fuel cell 10 an oxygen mixing unit realized as an oxygen jet pump 42 is coupled with the central oxygen tank 38 and comprises an oxygen input 44, an oxidant output 46 and an exhaust input 48. Supplying oxygen into the oxygen input 44 leads to mixing oxygen from the central oxygen tank 38 and exhaust gas from an exhaust gas line 50.

For the purpose of increasing the redundancy and reliability an oxidant supply unit 52 is provided between the air supply line 24 and the oxidant inlet 14 of the second fuel cell 10, wherein upstream of the oxidant supply unit 52 an air filter 53 is located. Thereby, it is possible to either exclusively supply oxygen to the oxidant inlet 14 or air, therefore the second fuel cell 10 may be operated in case the first fuel cell 8 has a failure, without excessively consuming pure oxygen from the oxygen tank 38 and still allowing inert gas to be produced for inerting or fire protection purposes.

The second fuel cell unit 6 basically equals the first fuel cell unit 4. A third fuel cell 54 is thereby connected in the same manner as the second fuel cell 10. A fourth fuel cell 56 equals a first fuel cell 8. For illustration purposes the whole fuel cell system 2 is shown in a symmetrical arrangement of the first fuel cell unit 4 and the second fuel cell unit 6.

For removing heat from the fuel cell system 2 the first fuel cell unit 4 and the second fuel cell unit 6 comprise individual cooling circuits with feed lines 58 and 60 and return lines 59 and 61, respectively. A first cooling circuit enclosing the feed line 58 and the return line 59 is symbolized with dashed-dotted lines. A second cooling circuit enclosing the feed line 60 and the return line 61 is symbolized with dashed lines. The feed lines 58 and 60 extend through both fuel cells in the respective fuel cell unit 4 and 6, respectively, in a serial connection. For the sake of clarity it is pointed out that a parallel connection or mixed parallel and serial connections may also be feasible. Heat is thereby delivered to a coolant flowing in the feed line 58 and 60, respectively and reaches heat sinks 62 and 64, respectively, which heat exchangers 62 and 64 are preferably realized as skin fin heat exchangers, e.g. positioned on a tail cone of an aircraft. Furthermore, the feed lines 58 and 60, respectively extend trough the hydrogen tank 36 and thereby introduce heat for vaporizing hydrogen for delivering to the hydrogen inlets 12 of the fuel cells 8, 10, 54 and 56.

In a preferred exemplary embodiment the air supplied to the air line 24 is trim air from a bleed driven environmental control system. The trim air may be routed through intermediate coolers 66 and 68, respectively, and also through filters 70 and 72 respectively. Thereby, air with a moderate temperature reaches the fuel cells 8 and 56, respectively. Alternatively, any other line coupled with an air source of an environmental control system may be used for supplying air to the fuel cell system 2.

Between the intermediate coolers 66 and the heat exchanger 62 a power electronic module 63, e.g. a DC/DC converter, may be arranged for transferring heat to the heat exchanger 62. On the other side, a power electronic module 65, e.g. a DC/DC converter, may be connected between the intermediate cooler 68 and the heat exchanger 64. The electric wiring is not depicted in detail to avoid confusion in FIG. 1. Basically, the fuel cells 8, 10, 54 and 56 are coupled with the power electronic modules 63 and 65 in order to produce a suitable electrical voltage for use in the aircraft.

As shown schematically, a control unit 37 may be coupled to the first fuel cell unit 4 and the second fuel cell unit 6 for controlling the operation of the fuel cell system and especially for switching the fuel cell system between the above mentioned three different modes of operation.

Figure 2:
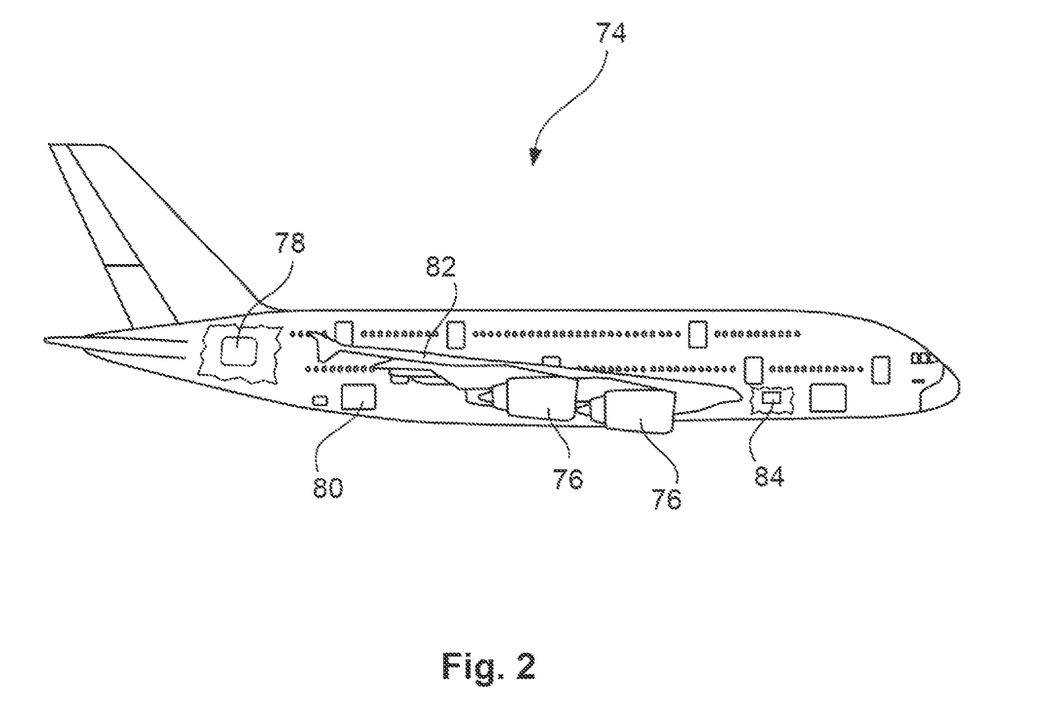
FIG. 2 shows an aircraft having a fuel cell.

FIG. 2 shows an exemplary embodiment of an aircraft 74 having turbo fan engines 76 that are exemplarily adapted for providing bleed air for internal use, e.g. for a bleed air driven environmental control system. Inside the aircraft 74 there is exemplarily located a fuel cell system 78 in an aft region, wherein the fuel cell system 78 is realized as depicted in FIG. 1. For the sake of clarity and readability the fuel cell system 78 is merely depicted as block.

The aircraft 74 may comprise one or more cargo compartments 80 that are realized as closed spaces for carrying cargo. It is not uncommon that cargo compartments comprise a fire extinguishing or fire suppressing system that is adapted for introducing a fire extinguishing or fire suppressing agent into the cargo compartment. As electrical power source in the aircraft 74 the fuel cell system 78 is a constant source of nitrogen enriched air. This nitrogen enriched air may be used for inerting the cargo compartment 80 or, in case of a fire, for suppression or extinguishing the fire. Additional fire extinguishing agents may be used.

Another option lies in the use of the inert gas for inerting fuel tanks, e.g. situated in wings 82. A further waste product of the fuel cell system 78 is water that arises from the fuel cell process. Water may be extracted from the exhaust gas by means of a water extraction device. The water may then accumulate into a water tank 84 or any other water consuming apparatus inside the aircraft 74.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A fuel cell system, comprising:
   a first fuel cell unit comprising at least one first fuel cell and at least one second fuel cell;
   a second fuel cell unit comprising at least one third fuel cell and at least one fourth fuel cell;
   a hydrogen tank;
   an oxygen supply unit configured for supplying pure oxygen;
   at least one air inlet;
   an exhaust switching unit; and
   an inert gas switching unit, the inert gas switching unit arranged downstream of the exhaust switch unit, the exhaust switching unit being connected to the inert gas switching unit and at least one of a water outlet and a drainage opening,
   wherein the first fuel cell unit and the second fuel cell unit are operable independently,
   wherein each of the first fuel cell, second fuel cell, third fuel cell and fourth fuel cell comprises a hydrogen inlet couplable with the hydrogen tank,
   wherein each of the first fuel cell, second fuel cell, third fuel cell and fourth fuel cell comprises an oxidant inlet,
   wherein the oxidant inlets of the first fuel cell and the fourth fuel cell are coupled exclusively with the at least one air inlet,
   wherein the oxidant inlets of the second fuel cell and the third fuel cell are coupled exclusively with at least one oxidant supply unit,
   said oxidant supply unit is selectively couplable with at least one of the oxygen supply unit and the at least one air inlet so as to supply either pure oxygen or air to the oxidant inlets of the second and the third fuel cells,
   wherein each of the first fuel cell, second fuel cell, third fuel cell and fourth fuel cell comprises an exhaust outlet,
   wherein the exhaust outlets of the first fuel cell and of the fourth fuel cell are couplable with at least one inert gas outlet,
   wherein the exhaust outlets of the second fuel cell and of the third fuel cell are coupled with the exhaust switching unit,
   wherein the inert gas switching unit selectively connects the exhaust switching unit to either an inert gas outlet connectable to a space to be inerted or to an inert gas outlet connected to a fire extinguishing apparatus, and
   wherein the fuel cell system is configured for either:
      operating at least one of the fuel cell units under exclusive consumption of hydrogen and oxygen independent of air, wherein the exhaust switching unit does not supply the inert gas switching unit, or
      operating at least one of the fuel cell units under exclusive consumption of hydrogen and air, independent of the oxygen supply unit, wherein the exhaust gas switching unit exclusively supplies the inert gas switching unit.

2. The fuel cell system of claim 1, wherein the oxidant supply unit comprises a manifold with an air inlet and an oxygen inlet and at least one check valve for preventing a crossflow of oxygen into a line coupled with the air inlet.

3. The fuel cell system of claim 1, wherein the at least one first fuel cell and the at least one second fuel cell of the first fuel cell unit, or the at least one third fuel cell and the at least one fourth fuel cell of the second fuel cell unit comprise a plurality of subcells, wherein adjacent subcells are associated to different fuel cells.

4. The fuel cell system of claim 1, further comprising an emergency power bus port and an interruption means, wherein the second fuel cell of the first fuel cell unit and the third fuel cell of the second fuel cell unit are coupled with the emergency power bus through the interruption means.

5. The fuel cell system of claim 1, further comprising a control unit coupled with the first fuel cell unit and the second fuel cell unit, wherein the control unit is adapted for controlling the operation of the first fuel cell unit and the second fuel cell unit, which operation comprises:
   the operation of either the first fuel cell unit or the second fuel cell unit in a first mode of operation, in which either at least one of the first fuel cell and the second fuel cell or at least one of the third fuel cell and the fourth fuel cell of the respective fuel cell unit is operated by the exclusive supply of air and hydrogen;
   the operation of either the first fuel cell unit or the second fuel cell unit in a second mode of operation, in which either only the second fuel cell or only the third fuel cell of the respective fuel cell unit is operated by the supply of oxygen and hydrogen without the supply of air; and
   the simultaneous operation of the first fuel cell unit and the second fuel cell unit in a third mode of operation, in which at least one of the first fuel cell and the second fuel cell and at least one of the third fuel cell or the fourth fuel cell in the respective fuel cell unit is operated by the exclusive supply of air and hydrogen.

6. The fuel cell system of claim 1, further comprising a cooling circuit for each of the first fuel cell unit and the second fuel cell unit, wherein each cooling circuit has a coolant line and a heat sink, the coolant line being thermally connected with the fuel cells of the respective fuel cell unit and with the heat sink.

7. The fuel cell system of claim 1, further comprising a mixing unit having an oxygen input, an exhaust input and an oxidant output couplable with the second fuel cell of the first fuel cell unit and the third fuel cell of the second fuel cell unit, wherein the mixing unit is adapted for mixing an exhaust gas and oxygen and providing a resulting mixture at the oxidant output, wherein the oxidant output is couplable to the at least one oxidant supply unit.

8. An aircraft comprising a fuel cell system comprising:
- a first fuel cell unit comprising at least one first fuel cell and at least one second fuel cell;
- a second fuel cell unit comprising at least one third fuel cell and at least one fourth fuel cell;
- a hydrogen tank;
- an oxygen supply unit configured for supplying pure oxygen;
- at least one air inlet;
- an exhaust switching unit; and
- an inert gas switching unit, the inert gas switching unit arranged downstream of the exhaust switch unit, the exhaust switching unit being connected to the inert gas switching unit and at least one of a water outlet and a drainage opening, wherein the first fuel cell unit and the second fuel cell unit are operable independently, wherein each of the first fuel cell, second fuel cell, third fuel cell and fourth fuel cell comprises a hydrogen inlet couplable with the hydrogen tank, wherein each of the first fuel cell, second fuel cell, third fuel cell and fourth fuel cell comprises an oxidant inlet, wherein the oxidant inlets of the first fuel cell and the fourth fuel cell are coupled exclusively with the at least one air inlet, wherein the oxidant inlets of the second fuel cell and the third fuel cell are coupled exclusively with at least one oxidant supply unit, said oxidant supply unit is selectively couplable with at least one of the oxygen supply unit and the at least one air inlet so as to supply either pure oxygen or air to the oxidant inlets of the second and the third fuel cell, wherein each of the first fuel cell, second fuel cell, third fuel cell and fourth fuel cell comprises an exhaust outlet, wherein the exhaust outlets of the first fuel cell and of the fourth fuel cell are couplable with at least one inert gas outlet, wherein the exhaust outlets of the second fuel cell and of the third fuel cell are coupled with the exhaust switching unit, wherein the inert gas switching unit selectively connects the exhaust switching unit to either an inert gas outlet connectable to a space to be inerted or to an inert gas outlet connected to a fire extinguishing apparatus, and wherein the fuel cell system is configured for either:
- operating at least one of the fuel cell units under exclusive consumption of hydrogen and oxygen independent of air, wherein the exhaust switching unit does not supply the inert gas switching unit, or
- operating at least one of the fuel cell units under exclusive consumption of hydrogen and air, independent of the oxygen supply unit, wherein the exhaust gas switching unit exclusively supplies the inert gas switching unit.

9. The aircraft of claim 8, further comprising at least one engine having a bleed air port, wherein the at least one air inlet of the fuel cell system is couplable with a bleed air port of the at least one engine.

10. The aircraft of claim 8, further comprising a bleed air driven environmental control system having a trim air supply unit, wherein the at least one air inlet of the fuel cell system is couplable with the trim air supply unit.

11. The aircraft of claim 8, further comprising an ambient air inlet couplable with the at least one air inlet of the fuel cell system.

12. The aircraft of any claim 8, further comprising at least first and second skin heat exchangers, each being coupled with a coolant circuit of the fuel cell system.

13. The aircraft of claim 8, wherein the hydrogen tank of the fuel cell system is thermally coupled with a coolant circuit of the fuel cell system.

* * * * *